Patented Oct. 13, 1942

2,298,459

UNITED STATES PATENT OFFICE 2,298,459

PREPARATION OF 4-METHYL HYDROXY COUMARINS

Albert B. Boese, Jr., Charleston, W. Va., assignor to Carbide and Carbon Chemicals Corporation, a corporation of New York No Drawing. Application October 9, 1940,
Serial No. 360,430

7 Claims. (Cl. 260—344)

My invention relates to the preparation of substances which are members of the group of organic compounds known as coumarins and coumarin derivatives and, more particularly, it is concerned with improved methods for the preparation of the 4-methyl hydroxy substituted coumarins of which typical examples are 4-methyl-7-hydroxy-coumarin, known also as 4-methyl-umbelliferone, and 4-methyl-7,8-dihydroxy coumarin, known also as 4-methyl-daphnetin.

The substituted couramins are products of considerable value in the arts of photolithography and photo-development. These substances also possess the property of being powerful absorbing agents for ultraviolet light and are, therefore, useful as constituents of ointments for the prevention of sunburn, as fluorescing indicators, and in other related fields which make use of this unusual property. 4-methyl umbelliferone and 4-methyl-daphnetin are particularly important as intermediate substances and, as such, are base materials from which a vast number of other substituted coumarins may be readily derived.

The substituted coumarins can be prepared by reaction of a phenol with an alkyl acetoacetic ester in the presence of a dehydrating agent, and the reaction proceeds according to the scheme:

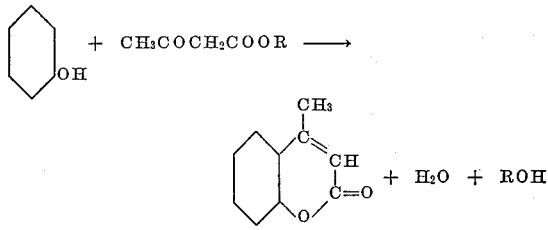

The procedure heretofore used in the art for the manufacture of these substituted coumarins calls for dissolving equimolecular weights of the reactants employed in four to five times their weight of a dehydrating agent, such as an acid or an acid salt having a strong affinity for water, allowing the mix to stand for several hours until the reaction is practically completed, and then pouring the reaction mix into water whereupon the product precipitates. During and after the precipitation step the product must be thoroughly washed with water until the alcohol formed as one product of the reaction has been removed. Any excess of acid present in the product must likewise be removed by this washing stage. Because this procedure requires a relatively large amount of dehydrating material and rather elaborate washing with water to remove one of the products and the excess acid it has proved expensive and time consuming, and, so far as is known, has not permitted practical use of the reaction.

My invention is directed to curing these deficiencies and it permits the preparation of substituted coumarins in a single operation in which separation of by-products is accomplished simultaneously with the main reaction, all as more fully hereinafter set forth in detail.

In general, the condensation-type reaction by which the substituted coumarins are formed proceeds more readily when polyhydric phenols are employed as reactants than when phenol itself is used. Thus, resorcinol, pyrogallol and other polyhydric phenols or their partially substituted derivatives may be employed depending on the particular product which is desired. The particular alkyl acetoacetic ester used as the other reactant likewise involves a choice between a wide variety of materials. The governing consideration influencing the selection of the ester to be employed is the ease with which the alcohol formed from the ester alkyl group can be separated from the mixture of products and reactants. The formation of a high boiling alcohol is undesirable because of the high temperature distillation or other expedient to which resort must be had to effect its separation. For this reason it is preferable to employ as reactants the acetoacetic esters of lower members of the series of aliphatic alcohols, such as the methyl and ethyl esters.

The choice of a condensation catalyst is not as wide a one practically as is the case with the reactants. Sulfuric acid, benzene sulfonic acid, anhydrous zinc chloride, phosphorus oxychloride and phosphorus pentoxide are useful substances in the role of catalyst for the reaction. Sulfuric acid and benzene sulfonic acid are preferable due to their relatively low cost and the readiness with which they may be removed from the products of reaction.

The process of my invention comprises conducting the reaction in the presence of a solvent which is inert to the reactants and product involved but which forms a constant boiling mixture with the water and alcohol produced as by-products. The azeotropic mixture of water, alcohol and inert solvent may be removed in the course of the reaction by continuous distillation, conducted with or without reflux. In either case the distillate may be collected in a water separator where the inert solvent separates from the alcohol and water as a substantially pure portion which may then be decanted and returned as reflux for the distillation column or as solvent replenishment directly to the distillation kettle, whichever is desired. The formation of an azeotropic mixture of the solvent, water and alcohol has another important effect in that it greatly facilitates the removal of the alcohol and water by-products which are formed during the reaction and thereby reduces or entirely eliminates the washing operation formerly required for this removal. Aromatic hydrocarbons, such as toluene and xylene, halogenated solvents, such as ethylene dichloride, and higher alcohols, such as butanol, have proved to be satisfactory solvents. It is preferable to employ as solvents those substances which have boiling points below approximately 150° C. for the reason that higher temperatures promote side reactions and consequent reductions in yields of the substituted coumarins.

My invention makes it possible to use only a very small amount of water-soluble substance as catalyst in combination with an inert and water-insoluble substance which functions as a water-removing agent under the conditions under which the reaction is carried out. This water-removing agent also removes by-product alcohol as well as water from the sphere of the reaction. By means of these combined effects many advantages are obtained. The most important of these would appear to be the maintenance of the condensation catalyst in a high state of efficiency by preventing its dilution with water, thereby making possible high yields of the desired product. Simultaneously with this, it permits reduction in the requirements of equipment and materials which results in enhanced production efficiency. Moreover, by this process, a purer crude product is obtained; this enables material reduction in the amount of washing and purification required in order to bring the crude product to acceptable standards of purity.

The following examples are herewith presented to illustrate my invention without in any way limiting it to the specific conditions, reactants, catalysts or solvents employed therein.

*Example I*

A 500-cc. flask fitted with a reflux condenser connected to a water separator was charged with 19.5 grams of ethyl acetoacetate, 16.5 grams of resorcinol and 0.1 gram of concentrated sulfuric acid dissolved in 150 cc. of toluene. The solution was heated under reflux for one hour, during which time the product separated from solution in the flask, and the theoretical amount of ethanol and water was removed as an azeotropic mixture with the toluene and was separated therefrom in the water separator, the separated toluene being returned as reflux. On filtering the reaction mixture, 25 grams of crude product were obtained which, on recrystallization from methanol, yielded 21.2 grams of pure beta-methyl umbelliferone as a pale yellow, crystalline compound which melted at 185° to 186° C. The yield secured was 83% of the theoretical yield. The reaction involved in this process may be shown as:

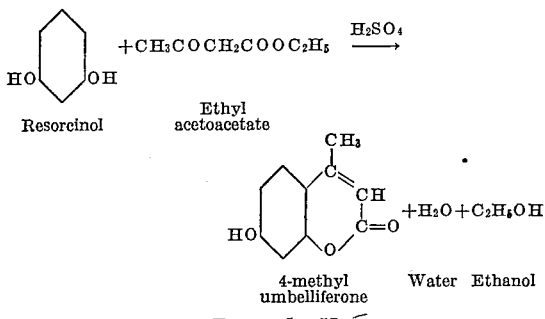

*Example II*

A one-liter flask fitted with a short fractionating column connected to a condenser was charged with 91 grams of resorcinol, 96 grams of methyl acetoacetate and 0.4 gram of benzene sulfonic acid dissolved in 400 cc. of ethylene dichloride. The solution was boiled gently, with slow distillation without reflux, until the temperature of the vapor reached 82° C. This required about one hour during which time the theoretical quantity of methanol and water and 100 cc. of ethylene dichloride distilled over. The product which separated in the flask was filtered off, washed with cold methanol and air-dried. The yield obtained was 113 grams of pure 4-methyl umbelliferone. By concentrating the filtrate an additional 11 grams of product were obtained making a total yield of 124 grams, or 89.3% of the theoretical yield.

*Example III*

A one-liter flask fitted with a short column connected to a condenser was charged with 63 grams (½ mol) of pyrogallol, 58 grams (½ mol) of methyl acetoacetate and 0.2 gram of benzene sulfonic acid dissolved in 400 cc. of butanol. The solution was distilled slowly without reflux until the vapor temperature reached 116° C. This required about two hours during which 200 cc. of liquid consisting of a mixture of methyl alcohol, water and butanol distilled over. The crystalline product which separated in the flask was filtered off, washed with ether and air-dried, yielding 72 grams of pure 4-methyl-daphnetin as an almost colorless, crystalline material which melted at 236° to 238° C. By further concentrating the filtrate, an additional 10 grams of product were obtained making a total yield of 82 grams, or 85.4% of the theoretical yield.

The reaction involved in this process may be shown as:

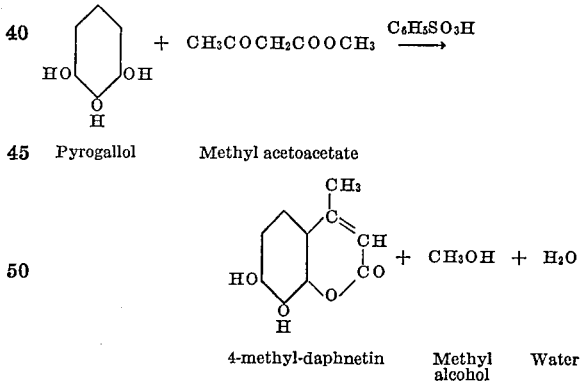

It will be readily apparent that my invention is capable of a great number of variations, and such variations are included within its scope as defined by the appended claims.

I claim:

1. In the process of preparing 4-methyl hydroxy coumarins by the reaction of a phenol and an acetoacetic ester in the presence of a condensation catalyst, the step of separating the water and alcohol concurrently produced during the reaction by employing an inert solvent to form an azeotropic mixture with the water and alcohol, distilling off said azeotropic mixture, and thereby securing said substituted coumarin in a state substantially free of water and alcohol.

2. In the process of preparing 4-methyl hydroxy coumarins by the reaction of a phenol and an acetoacetic ester in the presence of a condensation catalyst, the step of separating the water and alcohol concurrently produced during the reaction by employing an inert solvent to form an azeotropic mixture with the water and alcohol, distilling off said azeotropic mixture as said mixture is formed in the course of the reaction, and thereby securing said substituted coumarin in a state substantially free of water and alcohol.

3. In the process of preparing 4-methyl hydroxy coumarins by the reaction of a phenol and an acetoacetic ester in the presence of a condensation catalyst, the step of separating the water and alcohol concurrently produced during the reaction by employing an inert solvent with a boiling point below approximately 150° C. to form an azeotropic mixture with the water and alcohol, distilling off said azeotropic mixture as said mixture is formed in the course of the reaction, and thereby securing said substituted coumarin in a state substantially free of water and alcohol.

4. In the process of preparing 4-methyl hydroxy coumarins by the reaction of a phenol and an acetoacetic ester in the presence of a condensation catalyst, the step of separating the water and alcohol concurrently produced during the reaction by employing an inert solvent to form an azeotropic mixture with the water and alcohol, distilling off said azeotropic mixture as said mixture is formed in the course of the reaction accompanied by reflux of the separated solvent, and thereby securing said substituted coumarin in a state substantially free of water and alcohol.

5. In the process of preparing 4-methyl hydroxy coumarins by the reaction of a phenol and an acetoacetic ester in the presence of a condensation catalyst, the step of separating the water and alcohol concurrently produced during the reaction by employing as an inert solvent an aromatic hydrocarbon with a boiling point below approximately 150° C. to form an azeotropic mixture with the water and alcohol, distilling off said azeotropic mixture as said mixture is formed in the course of the reaction accompanied by reflux of the separated solvent, and thereby securing said substituted coumarin in a state substantially free of water and alcohol.

6. In the process of preparing 4-methyl hydroxy coumarins by the reaction of a phenol and an acetoacetic ester in the presence of a condensation catalyst, the step of separating the water and alcohol concurrently produced during the reaction by employing as an inert solvent a halogenated aliphatic hydrocarbon with a boiling point below approximately 150° C. to form an azeotropic mixture with the water and alcohol, distilling off said azeotropic mixture as said mixture is formed in the course of the reaction accompanied by reflux of the separated solvent, and thereby securing said substituted coumarin in a state substantially free of water and alcohol.

7. In the process of preparing 4-methyl hydroxy coumarins by the reaction of a phenol and an acetoacetic ester in the presence of a condensation catalyst, the step of separating the water and alcohol concurrently produced during the reaction by employing as an inert solvent an alcohol having 4 or more carbon atoms and having a boiling point below approximately 150° C. to form an azeotropic mixture with the water and alcohol, distilling off said azeotropic mixture as said mixture is formed in the course of the reaction accompanied by reflux of the separated solvent, and thereby securing said substituted coumarin in a state substantially free of water and alcohol.

ALBERT B. BOESE, JR.